United States Patent [19]

Goossens

[11] 4,197,335

[45] Apr. 8, 1980

[54] METHOD OF PROVIDING A POLYCARBONATE ARTICLE WITH A UNIFORM AND DURABLE ORGANOPOLYSILOXANE COATING

[75] Inventor: John C. Goossens, Mt. Vernon, Ind.

[73] Assignee: General Electric Company, Pittsfield, Mass.

[21] Appl. No.: 959,587

[22] Filed: Nov. 13, 1978

[51] Int. Cl.$^2$ .................... B05D 1/38; B05D 7/04; G02B 1/10
[52] U.S. Cl. .................... 427/162; 427/163; 427/164; 427/379; 427/387
[58] Field of Search ............... 427/162, 163, 164, 379, 427/387

[56] References Cited

U.S. PATENT DOCUMENTS

| | | | |
|---|---|---|---|
| 3,582,398 | 6/1971 | Ringler | 428/412 |
| 3,707,397 | 12/1972 | Gagnon | 428/412 |
| 3,968,305 | 7/1976 | Oshima et al. | 428/412 X |
| 3,968,309 | 7/1976 | Matsuo et al. | 428/409 |
| 3,978,178 | 8/1976 | Oshima et al. | 264/25 |
| 3,986,997 | 10/1976 | Clark | 428/412 X |
| 4,027,073 | 5/1977 | Clark | 428/412 |
| 4,041,120 | 8/1977 | Oshima et al. | 264/171 |
| 4,045,602 | 8/1977 | Sommer et al. | 427/387 X |

*Primary Examiner*—James R. Hoffman
*Attorney, Agent, or Firm*—Myron B. Kapustij; William F. Mufatti

[57] ABSTRACT

A process for providing a uniform, durable and tenaciously adhered scratch, mar, abrasion and chemical solvent resistant organopolysiloxane coating on a polycarbonate substrate. The process includes (i) applying a priming composition comprising an emulsion of a thermosettable acrylic polymer and a hydroxy ether to a polycarbonate substrate; (ii) curing the thermosettable acrylic polymer thereby forming a thermoset acrylic primer layer on said substrate; (iii) applying a top coat composition containing a further curable organopolysiloxane onto said primed substrate; and (iv) curing said further curable organopolysiloxane.

14 Claims, No Drawings

METHOD OF PROVIDING A POLYCARBONATE ARTICLE WITH A UNIFORM AND DURABLE ORGANOPOLYSILOXANE COATING

This invention relates to a method of applying a protective coating to a polycarbonate surface; more particularly, it relates to a method of providing a durably and tenaciously adhered organopolysiloxane coating on polycarbonate articles. The process includes priming a polycarbonate substrate with a primer composition comprised of an emulsion containing a thermosettable acrylic polymer and a hydroxy ether, curing the thermosettable acrylic polymer to form a thin primer layer, coating the primed substrate with a top coat composition containing a further curable organopolysiloxane, and curing said further curable organopolysiloxane.

BACKGROUND OF THE INVENTION

The use of transparent glazing material utilizing polycarbonate resin as a structural component for windows, windshields and the like are well known. While these polycarbonate resins are easily fabricated into the desired shape and have excellent physical and chemical properties, such as being less dense than glass and having more breakage resistance than glass, their abrasion, scratch and mar resistance is relatively low.

In order to overcome this relatively low scratch and mar resistance, various coatings have been applied to these polycarbonate resins. U.S. Pat. Nos. 3,451,838, 3,986,997 and 4,027,073 disclose organopolysiloxane coating compositions and techniques for the application of organopolysiloxane coatings onto these surfaces. While these coatings have many desirable properties, e.g., they are hard, mar-resistant, scratch-resistant, and chemical solvent resistant, these organopolysiloxane coatings do not in all instances possess the desired degree of uniform adherence to and durability on the polycarbonate surfaces. In order to improve the adhesion of the organopolysiloxane coatings to the substrate the prior art, as for example U.S. Pat. No. 3,707,397, has suggested priming the substrates prior to application of the organopolysiloxane coatings thereon.

The difficulty in applying an adhesion promoting primer to the polycarbonate resides in the polycarbonate resins' susceptibility to attack and degradation by some of the more active chemical materials, which materials may be present either in the primer itself or in the delivery system of the primer. Thus, the primer must not only act as an adhesion promoter between the organopolysiloxane and the polycarbonate, but must also be compatible with both the polycarbonate and the organopolysiloxane. Furthermore, not only must the primer itself be compatible with both the polycarbonate and the organopolysiloxane coating, but the delivery system by which the primer is applied onto the polycarbonate must not deleteriously affect the polycarbonate. Since the prior art generally teaches the delivery of the primer as a solution of the primer material dissolved in an organic solvent, and since many of these organic solvents aggressively attack the polycarbonate, such a means of applying a primer to a polycarbonate is not very effective or practical in producing mar-resistant coated polycarbonate articles.

There thus exists a need for polycarbonate articles having uniformly, tenaciously and durably adhered scratch, mar, abrasion and chemical solvent resistant coatings thereon and for a method of applying such coatings, and it is a primary object of the present invention to provide such articles and an effective method for producing these articles.

DESCRIPTION OF THE INVENTION

This invention relates to a method of coating polycarbonate articles with an organopolysiloxane coating by first priming the polycarbonate substrate with a primer emulsion composition containing a thermosettable acrylic polymer, water, and a hydroxy ether.

In the practice of the present invention, prior to the application of the organopolysiloxane coating onto the polycarbonate surface, the surface is first primed by the application thereon of a primer composition comprised of an emulsion containing water, a hydroxy ether and a thermosettable acrylic polymer. The water and hydroxy ether portion of the primer composition are then evaporated off and the resulting solid layer comprised of the thermosettable acrylic polymer is thermally cured to provide a thermoset acrylic primer layer. The primed polycarbonate is then coated with a top coat composition containing a solvent soluble further curable organopolysiloxane, the volatile solvents are driven off from said top coat composition leaving a solid layer comprised of the further curable organopolysiloxane, and the further curable organopolysiloxane is thermally cured thereby providing an adherent and durable organopolysiloxane top coat on the primed polycarbonate.

The carbonate polymer, preferably an aromatic carbonate polymer, of the instant invention has recurring units of the formula

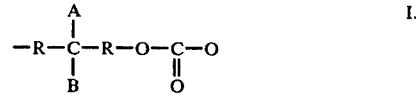

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymer of this invention may be prepared by methods well known in the art and as described in U.S. Pat. Nos. 3,161,615; 3,220,973; 3,312,659; 3,312,660; 3,313,777; 3,666,614; and 3,989,672, among others, all of which are incorporated herein by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I. contain branching groups.

The preferred polycarbonate resins may be derived from the reaction of bisphenol-A and phosgene. These polycarbonates have from 10–400 recurring units of the formula:

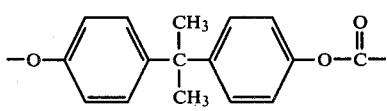
II.

The polycarbonate should have an intrinsic viscosity between 0.3 and 1.0, preferably from 0.40 to 0.65 as measured at 25° C. in methylene chloride.

The primer composition of the present invention is comprised of (i) a thermosettable acrylic polymer emulsion, and (ii) a hydroxy ether. The thermosettable acrylic polymer emulsion is comprised of a thermosettable acrylic polymer dispersed in water. The polymer is generally in the form of discrete spherical particles (approximately 0.1 micron in diameter) dispersed in water. Since the polymer particles are separate from the continuous aqueous phase, the viscosity of the dispersion or emulsion is relatively independent of the polymer's molecular weight. Consequently, the emulsion can contain polymers of high molecular weight and yet have a relatively low viscosity.

The thermosettable acrylic polymers present in the emulsion are well known in the art. Exemplary thermosettable acrylics which may be employed in the practice of this invention are set forth, for example, in *Encyclopedia of Polymer Science and Technology,* Vol. 1, Interscience Publishers, John Wiley & Sons, Inc., copyright 1964, at p. 273 et seq., and in *Chemistry of Organic Film Formers,* by D. H. Solomon, John Wiley & Sons, Inc., 1967 at p. 251 et seq. and the references cited therein, all of which are incorporated herein by reference.

These thermosettable acrylic polymers include: (I) acrylic copolymers having reactive functional groups which are capable of reacting between themselves to effect a cross-linkage thereof; (II) acrylic copolymers having reactive functional groups to which there is added an appropriate compatible cross-linking agent which will react with the functional groups to effect cross-linking; and (III) a mixture of two polymers having cross-linkable functional reactive groups.

Typically, the reactions involved in cross-linking the thermosettable acrylic polymers are reactions between, for example: epoxide functional groups and amine functional groups; epoxide functional groups and acid anhydride functional groups; epoxide functional groups and carboxyl functional groups, including phenolic hydroxyl groups; epoxide functional groups and N-methylol or N-methylol-ether; carboxyl functional groups and N-methylol or N-methylol-ether functional groups inter-reaction between carboxyl and isocyanate groups; reactions between hydroxyl, for example polyols, and isocyanate groups, and reactions between amine groups and N-methylol or N-methylol-ether groups. In the usual case of resin mixtures, the acrylic will be present in a major proportion, i.e., greater than 50 weight percent and, more typically, will be present in an amount in excess of about 70 percent. The needed functional group in the acrylic copolymer, which is the foundation of the thermosettable acrylic polymer, is provided by employing in the copolymerization a monomer which supplies the needed reactive functional group into the polymer chain. Usually, this copolymerizable functional group-supplying monomer will be present in small amounts, that is, on the order of 25 weight percent or less, and typically, between about 1 and 20 percent of the monomer mass which is polymerized. Exemplary of these functional group-supplying monomers are glycidyl acrylate, glycidyl methacrylate, allyl glycidyl ether, dimethylaminoethyl methacrylate, vinyl pyridine, tert-butylaminoethyl-methacrylate, maleic anhydride, itaconic anhydride, allyl alcohol, monoallyl ethers of polyols, hydroxyethyl methacrylate, hydroxypropyl methacrylate, hydroxypropyl acrylate, acrylamide, methacrylamide, maleamide, N-methylolmethacrylamide, vinyl isocyanate, allyl isocyanate. Usually, the other monomer which will be polymerized along with the monomer supplying the functional group is a lower ($C_1$–$C_2$) alkyl acrylic ester or mixtures thereof, e.g., methyl acrylate, ethyl acrylate, methyl methacrylate, ethyl methacrylate, styrene, or mixtures thereof, in an amount ranging between about 75 parts to about 99 parts and, more typically, between about 80 parts to about 97 parts.

These thermosetting acrylic polymer emulsions are commercially available and are sold by Rohm & Hass, Philadelphia, Pa. as their Rhoplex ®. Generally, these emulsions contain from about 40 to about 55% solids. However, in formulating the primer compositions, it has been found desirable that the compositions contain from about 1 to about 10% by weight solids. Thus, it is generally necessary to dilute these commercially available emulsions by the addition of water therein.

A second component of the primer compositions of the instant invention is a hydroxy ether. These hydroxy ethers are represented by the general formula $$R^1\!-\!O\!-\!R^2\!-\!OH \qquad \text{III.}$$

wherein $R^1$ is an alkyl radical containing from 1 to about 6 carbon atoms and $R^2$ is an alkylidene radical containing from 1 to about 6 carbon atoms, provided that the sum of the carbon atoms present is $R^1$ and $R^2$ is from 3 to about 10.

Generally, the primer composition of the present invention contains, in % by weight, from about 1 to about 10% acrylic solids, from about 20 to about 45% of hydroxy ether, and from about 45 to about 79% water. The presence of the afore-described hydroxy ether in amounts of from about 20 to about 45% by weight of the primer composition is critical to the satisfactory performance of the primer composition in forming an effective primer layer. If no hydroxy ether is present, or if an amount of hydroxy ether less than about 20 weight % is present, the primer composition does not flow evenly over the polycarbonate substrate, i.e., there is uneven distribution of the composition over the substrate with excessive concentrations of the composition in certain areas and the total absence of the primer composition in other areas. This results in an unevenly distributed and non-uniform primer layer being formed which, in turn, results in inferior adhesion of the silicone top coat and in a streaked appearance of the final product. If too much of the hydroxy ether is present, i.e., amounts greater than about 45 weight percent, coagulation and precipitation of the acrylic solids will occur.

The concentration of the acrylic polymer solids in the primer emulsion composition is also generally quite important. Organopolysiloxane top coats applied onto thermoset acrylic primers derived from primer emulsion compositions containing less than about 1 or more than about 10 weight percent of thermosettable acrylic polymer generally tend to have a marked decrease in durability of adhesion, especially after exposure to weathering, and abrasion resistance relative to organopolysiloxane top coats applied onto thermoset acrylic primers derived from primer emulsion compositions containing from about 1 to about 10 weight percent of a thermosettable acrylic polymer. Primer emulsion compositions containing from about 2 to about 6 weight percent of thermosettable acrylic polymer are preferred.

In the method of the present invention, a thin layer of the primer composition is applied onto the polycarbonate substrate by any of the well known methods such as spraying, dipping, roll-coating and the like. Generally, the primer composition is applied in an amount sufficient to provide a cured primer film of from about 0.01 to about 0.1 mil thick, preferably from about 0.02 to about 0.08 mil thick. The water and hydroxy ether are then evaporated off, as by air drying or mild heating, to leave an even and uniform solid layer comprised of thermosettable acrylic. This acrylic is then cured or thermoset by heating at a temperature of from about 90° to about 130° C., thereby forming a cured primer layer.

The organopolysiloxane top coat is applied onto this cured primer. In the practice of the method of the instant invention, an organopolysiloxane top coat composition containing a further curable organopolysiloxane is applied onto the cured primer, any volatile solvents present in the top coat composition are driven off, thereby leaving a solid layer containing said further curable organopolysiloxane, and said further curable organopolysiloxane is then cured to form a thermoset organopolysiloxane top coat.

The organopolysiloxane which is useful in the formulation of the silicone top coat that is applied to the foregoing cured primer composition is generally a silane selected from silanes of the formula

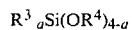   IV.

and the silanes of the formula

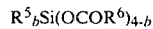   V.

and partial hydrolysis and condensation products thereof where $R^3$ and $R^4$ are selected from monovalent hydrocarbon radicals and halogenated monovalent hydrocarbon radicals and are preferably alkyl radicals of 1 to about 5 carbon atoms and phenyl radicals, where a is zero or 1, and $R^5$ and $R^6$ may be monovalent hydrocarbon radicals and halogenated monovalent hydrocarbon radicals but are preferably alkyl radicals of 1 to about 8 carbon atoms and phenyl radicals, where b may vary from 0 to 2. The above silanes or partial hydrolysis and condensation products of such silanes are applied in anywhere from about 10% to about 100% solids, wherein the solvent is water or an organic solvent, preferably alkanol. Such silane top coat composition is then allowed to cure at a temperature anywhere from 20° to 130° C. The silicone top coat composition is cured preferably at an elevated temperature to effect the proper cure, but the temperature should be below the glass transition temperature of the polycarbonate.

Such alkoxylated and acyloxy functional silanes are well known materials to silicone manufacturers and are easily obtainable. Thus, for instance, these silanes are noted in U.S. Pat. Nos. 3,720,699, 3,650,808, and 3,701,753.

These are not the only silicone top coats that may be utilized with the primer composition of the instant case. Other silicones which can be hydrolyzed or partially dissolved in a solvent in the foregoing solids content of 10 to 100% solids are, for instance, silicone resins composed of trifunctional and difunctional units, silicone resins composed of trifunctional units, difunctional units and tetrafunctional units where the organo substituent groups in the trifunctional units may be selected from alkyl radicals of 1 to 8 carbon atoms and are preferably, methyl, phenyl and vinyl; and wherein the organo substituent groups in the difunctional siloxy units may be selected again from alkyl radicals of 1 to 8 carbon atoms, vinyl radicals and phenyl radicals. Such silicone resins usually have an organic to silicon atom ratio of 1:1 to 1.9:1; may have a silanol content that varies anywhere from 4 to 10 weight percent and optionally may have an alkoxy content that varies from 2 to 4%. The preparation of such silicone resins which may be utilized as top coats in the invention of the instant case are, for instance, to be found in the patents of Duane F. Merrill, i.e., U.S. Pat. Nos. 3,375,223, 3,435,001, 3,450,672, 3,790,527, 3,832,319, 3,865,766, 3,887,514 and 3,925,276. However, it must be pointed out that such silicone resins are not the preferred silicone top coat materials of the invention of the instant case. The foregoing alkoxy silanes of Formula IV and the foregoing acyloxy functional silanes of Formula V are preferred. Other well known silicone top coat compositions for metals, plastics, ceramics and glass may be utilized with the primer composition of the instant invention.

In formulating the organopolysiloxane top coat composition of the instant invention, the organopolysiloxane may be produced from the afore-described silanes or may be purchased as a further curable organopolysiloxane from various manufacturers in a commercially available form. If the organopolysiloxane is prepared from the silane compounds, it may generally be converted into the organopolysiloxane top coating by the following general procedure. The organosilane compound or compounds are generally hydrolyzed at temperatures of from about 20° to about 50° C. for a period of time from about 1 to about 10 hours, in the presence of water. Generally, the mixture is held at reduced pressures at temperatures of from 20° to about 100° C., for a period of time sufficient to effect the removal of the byproduct alcohol and excess water. This also affects the further condensation of the product to produce a heat curable organopolysiloxane. This partially condensed organopolysiloxane is then dissolved in an organic solvent, e.g., a polar solvent such as dioxane, methanol, ethanol, butanol, acetone, ethyl acetate, benzene, xylene, toluene, etc. The heat-curable organopolysiloxane is then partially cured, e.g., at a temperature from about 90° to about 140° C. This precured, further curable organopolysiloxane is then applied, as a coating composition containing from about 5 to about 50 weight percent of organopolysiloxane and from about 50 to about 95% by weight of the afore-described solvent, to the primed polycarbonate by any of the conventionally used afore-described methods. After the coating composition has been applied onto the primed polycarbonate, the solvent is evaporated and the organopolysiloxane is heat cured to provide a thermoset organopolysiloxane coating on the primed polycarbonate.

If the organopolysiloxane coating is to be applied from a commercially available further curable organopolysiloxane, the following procedure is used. An organopolysiloxane coating composition is prepared by adding to a commercially available further curable organopolysiloxane sufficient organic solvent to form a coating composition containing from about 5 to about 85% by weight of the further curable organopolysiloxane and from about 15% to about 95% by weight of the organic solvent. This coating composition is then applied by any convenient method, e.g., dipping, spraying, roll-coating, brushing and the like, to the primed polycarbonate. The solvent is then evaporated and the further curable organopolysiloxnae is heat cured to provide a thermoset organopolysiloxane coating on the primed polycarbonate.

In addition to the further curable organopolysiloxane and the solvent, the organopolysiloxane coating composition may also contain curing agents for the organopolysiloxane to accelerate the rate of cure at any selected temperature, fillers such as glass, mica, talc, silicates, and silica, such as colloidal silica; flatting agents, surface active agents, thixotropic agents, and UV light absorbers. It is, of course, understood that these optional additives may be present in an amount and of such a nature as to not deleteriously affect the curing of the organopolysiloxane, or the physical and chemical properties, such as non-opaqueness, scratch, abrasion and chemical resistance, and hardness of the cured coating.

Thus, the process of the present invention comprises the steps of: (i) applying onto a polycarbonate substrate a primer emulsion composition containing, in percent by weight, (a) from about 1 to about 10 percent of a thermosettable acrylic polymer, (b) from about 20 to about 45 percent of a hydroxy ether, and from about 45 to about 79 percent of water; (ii) evaporating off the water and the hydroxy ether from said composition to leave a solid layer comprised of said thermosettable acrylic polymer; (iii) thermally curing said thermosettable acrylic polymer thereby forming a primer layer comprised of a thermoset acrylic; (iv) applying a top coat composition containing a further curable organopolysiloxane onto said primed polycarbonate; (v) evaporating off any volatile solvents present in said top coat composition to leave a solid layer comprised of said further curable organopolysiloxane; and (vi) curing the further curable organopolysiloxane.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein.

EXAMPLE 1

A commercially available thermosettable acrylic emulsion (46.5–47.5% solids in water) is diluted with sufficient water and butoxy ethanol to provide a primer emulsion composition containing 1 weight percent solids dispersed in a water/butoxy ethanol system containing a ratio of 35 parts by weight butoxy ethanol to 65 parts by weight water. One such commercially available thermosettable acrylic emulsion is available from Rohm & Haas, Philadelphia, Pa., as their Rhoplex AC-658.

This primer emulsion composition is flow coated onto clear generally rigid 6"×8"×¼" polycarbonate panels, said polycarbonate being derived from a diphenol monomer such as bisphenol-A(2,2'-bis(4-hydroxyphenyl)propane). The coated polycarbonate panel is then air dried to evaporate off the water and butoxy ethanol. After air drying, the panel is baked at 120° C. for one hour to cure the thermosettable acrylic. The resulting thermoset acrylic primer layer is about 0.01 mil thick.

The primed polycarbonate panel is then flow coated with a commercially available organopolysiloxane composition (a composition containing 27% solids, which include the hydrolysis and partial condensation products of methyl triethoxy silane, in a solvent system of tetrahydrofuran, ethoxy ethanol, ethanol and butanol). One such commercially available further curable organopolysiloxane composition is available from Resart-Ihm A.G., Mainz, Federal Republic of Germany, as their Resarix SF/PC. The top coated primed polycarbonate panel is air dried to evaporate off the solvents from the top coat composition and is then baked at 120° C. for one hour to cure the further curable organopolysiloxane. This primed, top coated polycarbonate panel is then subjected to a scribed adhesion test and to an abrasion test and the results are set forth in Table I. The scribed adhesion test consists of using a multiple blade tool to cut parallel grooves about 1 mm apart through the coating into the substrate, rotating the sample 90° and repeating the cutting process thereby forming a grid pattern of 1 mm squares cut into the coating, and applying an adhesive tape over the cross-hatched area and quickly pulling said tape off. A sample fails the adhesion test if any of the squares in the grid are pulled off. The abrasion test is one wherein test panels having a ¼ inch diameter hole cut in the center are subjected to a Taber Abraser. The Table Abraser is equipped with CS-10F wheels which are resurfaced every 200 cycles by abrading for 25 cycles on a S-11 refacing disc. The weights used in combination with the CS-10F wheels are 500 gm. weights. Initial measurements of % Haze are made at four places around the future wear track of the sample using a Gardner Hazemeter. The sample is abraded for 100, 300 and 500 cycles, cleaned with isopropanol, and the % Haze is remeasured at the same four places. The four differences in % Haze are calculated and averaged to give the Δ% Haze.

EXAMPLE 2

A Rhoplex AC-658 acrylic emulsion is diluted with sufficient water and butoxy ethanol to provide a primer emulsion composition containing 2 weight percent solids dispersed in a water/butoxy ethanol system containing a ratio of 35 parts by weight butoxy ethanol to 65 parts by weight water.

This primer emulsion composition is flow coated onto clear, generally rigid 6"×8"×¼ polycarbonate panels. The coated polycarbonate panels are then air dried to evaporate off the water and butoxy ethanol. After air drying, the panel is baked at 120° C. for one hour to cure the thermosettable acrylic. The resulting thermoset acrylic primer layer is 0.01 mils thick.

The primed polycarbonate panel is then flow coated with a Resarix SF/PC composition containing a further curable organopolysiloxane. The top coated primed polycarbonate panel is air dried to evaporate off the solvents from the top coat composition and is then baked at 120° C. for one hour to cure the further curable organopolysiloxane. This primed, top coated polycarbonate panel is subjected to the afore-described abrasion and scribed adhesion tests and the results are set forth in Table I.

EXAMPLE 3

A Rhoplex AC-658 acrylic emulsion is diluted with sufficient water and butoxy ethanol to provide a primer emulsion composition containing 4 weight percent solids dispersed in a water/butoxy ethanol system containing a ratio of 35 parts by weight butoxy ethanol to 65 parts by weight water.

This primer emulsion composition is flow coated onto a clear, generally rigid 6"×8"×¼" polycarbonate panel. The coated polycarbonate panel is then air dried to evaporate off the water and butoxy ethanol. After air drying, the panel is baked at 120° C. for one hour to cure the thermosettable acrylic. The resulting thermoset acrylic primer layer is 0.02 mils thick.

The primed polycarbonate panel is then flow coated with a Resarix SF/PC composition containing a further curable organopolysiloxane. The top coated primed polycarbonate panel is air dried to evaporate off the solvents from the top coat composition and is then baked at 120° C. for one hour to cure the further curable organopolysiloxane. This primed, top coated polycarbonate panel is then subjected to the afore-described abrasion and scribed adhesion tests and the results are set forth in Table I.

EXAMPLE 4

Onto a clear generally rigid 6"×8"×¼" polycarbonate panel is flow coated a Resarix SF/PC composition containing a further curable organopolysiloxane. The coated polycarbonate panel is air dried to evaporate off the solvents from the top coat composition and is then baked at 120° C. for one hour to cure the further curable organopolysiloxane. This unprimed, top coated polycarbonate panel is then subjected to the afore-described abrasion and scribed adhesion tests and the results are set forth in Table I.

TABLE I

| Example No. | Adhesion Test | % Haze/ 100 Cycles | % Haze/ 300 Cycles | % Haze/ 500 Cycles |
|---|---|---|---|---|
| 1 | Pass | 0.7 | 3.9 | 11.2 |
| 2 | Pass | 0.8 | 3.7 | 10.7 |
| 3 | Pass | 0.6 | 3.2 | 8.8 |
| 4 | Fail | 1.0 | 10.3 | 32.0 |

As can be seen from Table I, the organopolysiloxane top coats applied onto polycarbonate panels primed in accordance with the method of the present invention have improved adhesion and superior abrasion resistance relative to organopolysiloxane top coats applied onto unprimed polycarbonate panels.

While the invention has been described above with particularity, it will, of course, be apparent that modifications may be made which, pursuant to the patent statutes and laws, do not depart from the scope of the instant invention.

What I claim as new and desire to secure by Letters Patent of the United States is:

1. A method of producing a polycarbonate article having improved mar, abrasion, scratch and chemical solvent resistance comprising the steps of:
   (i) applying onto a polycarbonate substrate a primer emulsion composition containing, in percent by weight, (a) from about 1 to about 10 percent of a thermosettable acrylic polymer, (b) from about 20 to about 45% of a hydroxy ether, and (c) from about 45 to about 79 percent of water;
   (ii) evaporating off a substantial portion of said water and hydroxy ether from said primer emulsion composition to form a substantially solid layer comprised of thermosettable acrylic polymer;
   (iii) thermally curing said thermosettable acrylic polymer to form a thermoset acrylic primer layer;
   (iv) applying onto said cured primer layer a top coat composition comprised of a further curable organopolysiloxane;
   (v) evaporating off a substantial portion of any solvents present in said top coat composition thereby forming a layer comprised of further curable organopolysiloxane; and
   (vi) curing said further curable organopolysiloxane thereby forming a cured organopolysiloxane top coat.

2. A method of claim 1 wherein said hydroxy ether is represented by the general formula $$R-O-R^1-OH$$

wherein R is an alkyl radical containing from 1 to about 6 carbon atoms and $R_1$ is an alkylidene radical containing from 1 to about 6 carbon atoms, provided that the sum of the carbon atoms present in R and $R^1$ is from 3 to about 10.

3. The method of claim 2 wherein said hydroxy ether is butoxy ethanol.

4. The method of claim 1 wherein said further curable organopolysiloxane is the hydrolysis and partial condensation product of an alkyl trialkoxysilane.

5. The method of claim 4 wherein said alkyl trialkoxysilane is methyl trialkoxysilane.

6. The method of claim 1 wherein said polycarbonate article is a sheet.

7. The method of claim 6 wherein said sheet is transparent.

8. A method for providing a uniform and durably adhered mar, scratch, abrasion and chemical solvent resistant organopolysiloxane coating on a polycarbonate article which comprises:
   (i) applying onto the surface of a polycarbonate substrate a primer emulsion composition containing, in percent by weight, (a) from about 1 to about 10 percent of a thermosettable acrylic polymer, (b) from about 20 to about 45 percent of a hydroxy ether, and (c) from about 45 to about 79 percent of water;
   (ii) evaporating off a substantial portion of said water and hydroxy ether from said primer emulsion composition to form a layer comprised of a thermosettable acrylic;
   (iii) thermally curing said thermosettable acrylic to form a thermoset acrylic primer layer;
   (iv) applying onto said cured primer layer a top coat composition containing a further curable organopolysiloxane;
   (v) evaporating off a substantial portion of any solvents present in said top coat composition thereby forming a layer comprised of further curable organopolysiloxane; and
   (vi) further curing said organopolysiloxane thereby forming a cured organopolysiloxane coating.

9. The method of claim 8 wherein said hydroxy ether is represented by the general formula $$R-O-R^1-OH$$

wherein R is an alkyl radical containing from 1 to about 6 carbon atoms and $R^1$ is an alkylidene radical containing from 1 to about 6 carbon atoms, provided that the sum of the carbon atoms present in R and $R^1$ is from 3 to about 10.

10. The method of claim 9 wherein said hydroxy ether is butoxy ethanol.

11. The method of claim 8 wherein said further curable organopolysiloxane is the hydrolysis and partial condensation product of an alkyl trialkoxy silane.

12. The method of claim 11 wherein said alkyl trialkoxy silane is methyl trialkoxy silane.

13. The method of claim 8 wherein said polycarbonate article is a sheet.

14. The method of claim 13 wherein said sheet is transparent.

* * * * *